United States Patent [19]
Kuramoto et al.

[11] 3,777,637
[45] Dec. 11, 1973

[54] AUTOMATIC EXPOSURE CONTROL DEVICE FOR A PHOTOGRAPHIC CAMERA

[75] Inventors: Yoshio Kuramoto; Kayoshi Tjujimoto, both of Osaka; Hiroshi Ueda, Nara, all of Japan

[73] Assignee: Minolta Camera Kabushiki Kaisha, Osaki-shi, Osaku-fu, Japan

[22] Filed: May 18, 1972

[21] Appl. No.: 254,506

[30] Foreign Application Priority Data
May 31, 1971 Japan.............................. 46/37049

[52] U.S. Cl............................. 95/10 CD, 95/64 D
[51] Int. Cl........................... G03b 7/08, G03b 9/06
[58] Field of Search...................... 95/10 CE, 10 CD, 95/64 R, 64 D

[56] References Cited
UNITED STATES PATENTS
| | | | |
|---|---|---|---|
| 3,528,351 | 9/1970 | Konig | 95/10 CD |
| 3,605,588 | 9/1971 | Ort et al. | 95/10 CD |
| 3,611,895 | 10/1971 | Albedyll | 95/10 CD |

*Primary Examiner*—Samuel S. Matthews
*Assistant Examiner*—Russell E. Adams, Jr.
*Attorney*—Watson et al.

[57] ABSTRACT

An automatic exposure control device for a photographic camera provided with an exposure control circuit including a light receiving element receiving the scene light passing through an objective lens and a diaphragm, and operating in accordance with photographic conditions such as the generated current of said light receiving element, the set shutter speed and the set film sensitivity in the camera, an electromagnetic coil whose magnetic field varies according to the output of said exposure controlling circuit, and a retaining member retaining the diaphragm in a fully open state so biased that the aperture will be reduced from its fully open condition. While closing the switch of the exposure controlling circuit prior to the shutter is initiated for actuating the exposure controlling circuit, releasing the retaining member thereby causes the diaphragm to start reducing the aperture size and when the brightness of the scene light passing through said objective lens and the diaphragm becomes the correct value with respect to the set shutter speed and the set film sensitivity, the diaphragm aperture is prevented from being reduced according to the variation of the magnetic field of said electromagnetic coil for controlling the diaphragm aperture.

9 Claims, 6 Drawing Figures

AUTOMATIC EXPOSURE CONTROL DEVICE FOR A PHOTOGRAPHIC CAMERA

BACKGROUND OF THE INVENTION

The present invention relates to an automatic exposure control device for a photographic camera in which the shutter speed is set up beforehand and the diaphragm aperture is controlled in response to the intensity of the light brought incident upon a light receiving element passing through the objective lens and the diaphragm from the object to be photographed.

In prior photographic cameras in which exposure is controlled by the generated current of a light receiving element receiving the scene light passing through the objective lens and the diaphragm, the light receiving element must be arranged so that the formation of images on films are not arrested by the scene light. Accordingly, the light receiving element, in a single lens reflex camera, is normally arranged in the reflected optical path where, by means of a moving reflecting mirror, the scene light is reflected in a view finder.

However, such a reflected optical path, in photography, cannot control exposure when film exposure is made for the reason that the scene light which had passed through the objective lens and the diaphragm is cut off by the moving reflecting mirror.

Hence, the scene light must be detected prior to exposure so as to be memorized, and a memory means controlling exposure in accordance with the memory value becomes necessary. In addition, when the scene light prior to exposure is detected in a condition in which the diaphragm is fully opened, it becomes necessary to provide a means by which the value detected may be converted to the diaphragm aperture in photographing.

Therefore, it has been quite difficult to receive the light that passed through the objective lenses and the diaphragm apertures with the use of the prior art devices wherein the generated current is detected to automatically control the diaphragm aperture forming the correct exposure with respect to shutter speed set up in a camera and the film sensitivity of the film used in it.

THE OBJECTS OF THE INVENTION

One object of the present invention is to provide an automatic exposure control device for a photographic camera in which, by detecting the generated current of a light receiving element receiving the scene light which passed through an objective lens and a diaphragm, an exposure controlling circuit automatically controls the correct diaphragm aperture to control the exposure, with respect to shutter speed set up in the camera and the film sensitivity of the film used in it.

Another object of the present invention is to provide an automatic exposure control device for a photographic camera in which, when an attachable lens provided with an objective lens having various apertures and focal lengths and a diaphragm is attached to a camera, an exposure controlling circuit, detecting the generated current of a light receiving element receiving the scene light passing through the attachable lens and the diaphragm, controls the diaphragm aperture of the attachable lens in order to decide the correct value with respect to the shutter speed set up in the camera and the film sensitivity of the film used in it.

Still another object of the present invention is to provide an automatic exposure control device for a photographic camera which, while closing the switch of an exposure controlling circuit thereby operating the exposure controlling circuit and consequently, by releasing the retention of the retaining member which retains a diaphragm so biased in a fully open condition that the diaphragm aperture will be decreased from its fully open condition, and reducing the diaphragm aperture size, the intensity of the scene light passing through the objective lens and the diaphragm, while said aperture size is reduced, becomes the correct value with respect to the shutter speed set up in the camera and the film sensitivity of the film used in it, and checks the reduction of the diaphragm aperture size and thereby controls exposure.

Other and further objects of the present invention are to provide an automatic exposure control device for a photographic camera in which, by detecting the generated current of a light receiving element receiving the scene light that passed through an objective lens and a diaphragm, an exposure controlling circuit retains said diaphragm so that the aperture size will be reduced by actuating the retaining member from its fully open position so as to decide a correct value with respect to the shutter speed set up in the camera and the film sensitivity of the film used in it. Also, while the diaphragm is being retained by the retaining member, the light receiving element is withdrawn from the optical path where images are formed on films passing through said objective lens, after which the shutter is caused to operate.

SUMMARY OF THE INVENTION

The present invention, for the accomplishment of the aforementioned objects, relates to an automatic exposure control device for a photographic camera provided with an exposure control circuit including a light receiving element receiving the scene light passing through an objective lens and a diaphragm, and operating in accordance with photographic conditions such as the generated current of the light receiving element, the shutter speed set up in the camera and the film sensitivity of the film used in it. Also included is an electromagnetic coil whose magnetic field varies according to the output of the exposure controlling circuit, and a retaining member retaining the diaphragm in a fully open condition and so biased that the aperture will be reduced from the fully open condition. While closing the switch of the exposure controlling circuit prior to the time the shutter is caused to initiate, the exposure controlling circuit is actuated and the retention of the retaining member is released at a fully open aperture position thereby causing the diaphragm to begin reducing the aperture size. And when the brightness of the scene light passing through the objective lens and the diaphragm approaches the correct value with respect to the shutter speed set up in the camera, and the film sensitivity of the film used in it, the diaphragm aperture size is prevented from being reduced according to the variation of the magnetic field of the electromagnetic coil thereby controlling the diaphragm.

At the same time that an exposure controlling circuit is caused to start operating prior to the initiating of the shutter, while reducing the diaphragm aperture size from its fully open position, detects the scene light passing through the diaphragm and an objective lens and, when its detection value approaches the correct value with respect to the shutter speed and the film sensitivity set up in the camera, the aperture is prevented from being reduced by means of the diaphragm, thereby controlling the diaphragm aperture automatically.

Therefore, according to the present invention, the aperture, especially in an attachable lens, is caused to be opened fully prior to the operating of the exposure controlling circuit and, at the interval between the operation by which the exposure controlling circuit is actuated and the exposure is initiated by means of the shutter releasing, the aperture size may be reduced by means of the diaphragm to effect the correct diaphragm aperture in accordance with the brightness of an object and photographic conditions set up in the camera.

DESCRIPTION OF THE PREFERRED EMBODIMENTS

Figure 1:
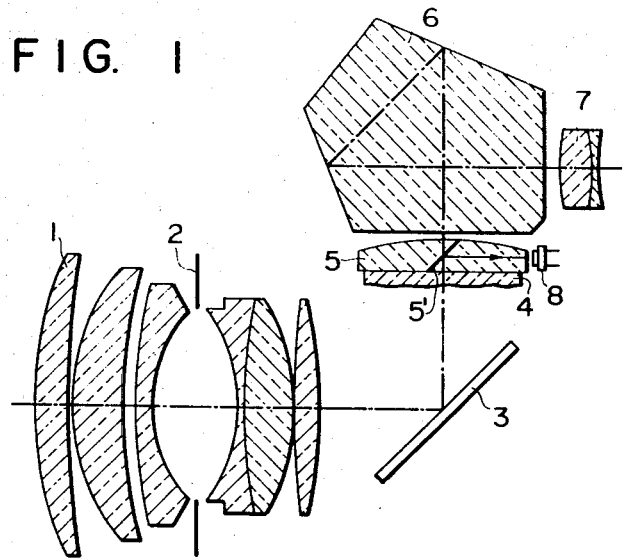
FIG. 1 is an elevational side-view showing the arrangement of the optical system and the light receiving element in the first embodiment of the present invention.

FIG. 1 shows the arrangement of the optical lens system and the light receiving element of the camera in accordance with a first embodiment of the present invention. Objective lens 1 is provided with a diaphragm 2. These are structurally arranged as being an attachable lens type, although they are fitted firmly into the camera. The structure of the present device is of the attachable lens type in each of the embodiments of the invention.

A reflecting mirror 3 is supported for rotation on an axle about its axis within the camera body. This reflecting mirror 3 may be moved, in relation to the operation of the shutter release, to its position of rest thereby cutting off the scene light which passed through objective lens 1 and diaphragm 2 so that the scene light will not reach the film (not shown in the drawing). Mirror 3 serves to reflect the scene light on a focusing plate 4 of the camera, and permits entry of the scene light to an eye-piece lens 7 via a condenser lens 5 and a pentagonal prism 6, the mirror may also be moved to a position where it is withdrawn from the scene light by which exposure is given to the film.

A small reflecting mirror 5', disposed firmly at an angle of 45° to the optical axis, is provided at the center of condenser lens 5. Also, a light receiving element 8 is located on the optical axis reflected by the mirror 5'. Such a light receiving element may comprise a photoelectric cell which is highly responsive to the incident light.

Figure 2:
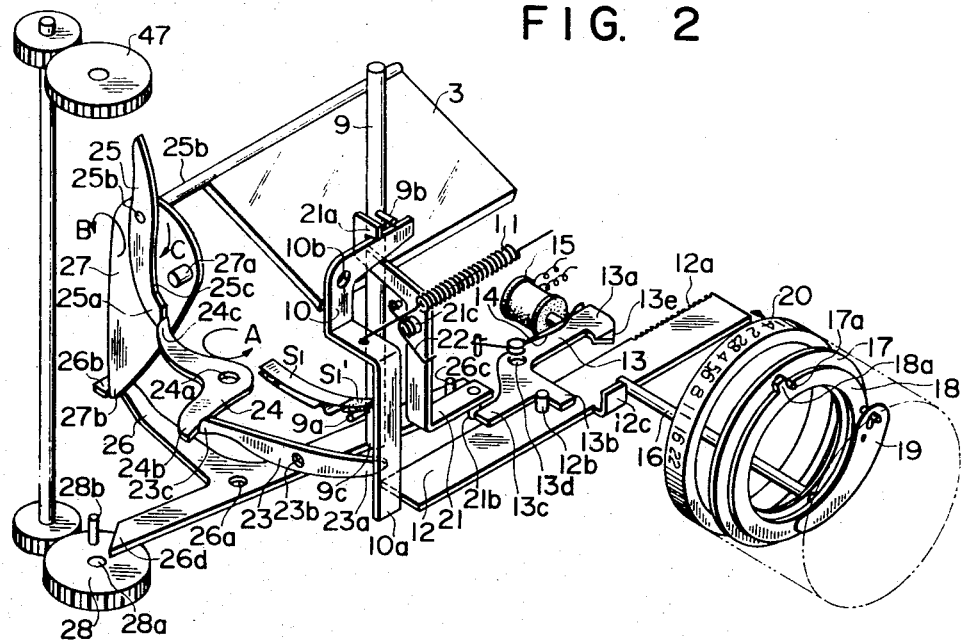
FIG. 2 is a perspective view showing the arrangement of the principal parts of the first embodiment.

In FIG. 2, a first pin 9a and a second pin 9b are mounted on a release button 9 arranged for movement up and down with respect to the camera body. An insulated plate $S_1'$, is provided on a source switch $S_1$ which is biased to close the exposure controlling circuit, to be hereinafter described. As button 9 is moved downwardly, pin 9a moves slightly away from plate $S_1'$ at an early stage of the downward stroke thereby closing switch $S_1$. Therefore, an electromagnet 15 is excited by the exposure controlling circuit, to be hereinafter described.

Moreover, when release button 9 is pressed down, the second pin 9b rotates a lever 10 clockwise about an axle on the camera body extending through axle hole 10b. Lever 10 is biased for counterclockwise rotation about the axle through hole 10b, by means of a spring 11. A slideable working plate 12 engages with the lower end 10a of lever 10.

This working plate 12 is provided with a flange 12c which is engageable with a diaphragm adjusting pin 16 arranged on one side of the attachable lens and is further provided with a pin 12b engageable with an arm 13b of a stop lever 13 to be hereinafter described. Plate 12 also has a toothed portion 12a thereon engageable with a pawl 13e of stop lever 13.

Stop lever 13 is supported for rotation about an axle on the camera body extending through a hole 13d and consists of a three armed lever biased for rotation in a clockwise direction by means of a spring 14. Pawl 13e is formed at one end of arm 13a facing forwardly in the direction of clockwise movement of the lever. The side of arm 13a, opposite the side at which pawl 13e is formed, faces the electromagnet 15 which is mounted firmly within the camera body. Lever 13 is therefore attracted by the electromagnet 15 whose magnetic field varies according to the output of the exposure controlling circuit as to be hereinafter described more fully. Also, the edge of the second arm 13b, which faces forward in the direction of rotation of lever 13, engages pin 12b of working plate 12, as shown in FIG. 2. Moreover, the edge of third arm 13c, which faces forward in the direction of rotation of lever 13, engages a pin 21b of a retaining lever 21 which, as can be seen, engages with lever 10.

Retaining lever 21 is supported for rotation about an axle mounted on the camera body and extending through an axle hole 21c. Lever 21 is biased for clockwise rotation by means of a spring 22, and is provided with a U-shaped arm 21a at one end thereof. An arm of lever 10 is engageable with or detachable from the U-shaped end 21a in accordance with the rotational position of lever 10. That is, the U-shaped end 21a comes into contact with lever 10 when release button 9 is moved up and lever 10 is rotated counterclockwise; and end 21a is out of contact with lever 10 and retains the arm of lever 10 therewithin when release button 9 is pressed down and lever 10 is rotated clockwise.

Also, one arm 23a of a camera release lever 23 is disposed directly below the lower end 9c of release button 9 and the other arm 23c is engageable with and detachable from an arm 24b of an intermediate lever 24. This intermediate lever 24 is supported for rotation about an axle mounted on the camera body and extending through a hole 24a. Also, lever 24 is biased for rotation in the direction of the arrow A by means of a spring, not shown in the drawing. The other arm 24c of lever 24 is engageable with and detachable from an arm 25a of a mirror lever 25 which is supported for rotation about axle 25b in the direction of the arrow B. Mirror 3 of the camera is fixedly mounted on rotatable axle 25b of mirror lever 25.

A mirror return lever 27 is also supported on axle 25b for rotation in the direction of the arrow C by means of a spring (not shown) which has a stronger spring characteristic as compared to the spring used to bias lever 25 in the direction of the arrow B. A pin 27a is mounted on mirror return lever 27 and, when mirror lever 25 is rotated in the counterclockwise direction B, pin 27a engages with a side edge 25c of the mirror lever, thereby retaining mirror 3 in a parallel position with respect to the optical axis of the objective lens. Also, when mirror return lever 27 is rotated clockwise, pin 27a tends to return mirror 3 from the above position to the rest position located at an angle of 45 degrees to the optical axis.

Moreover, a projection 27b is formed on mirror return lever 27 and is engageable and detachable from a hook 26b of a three-armed connecting lever 26.

Figure 4:
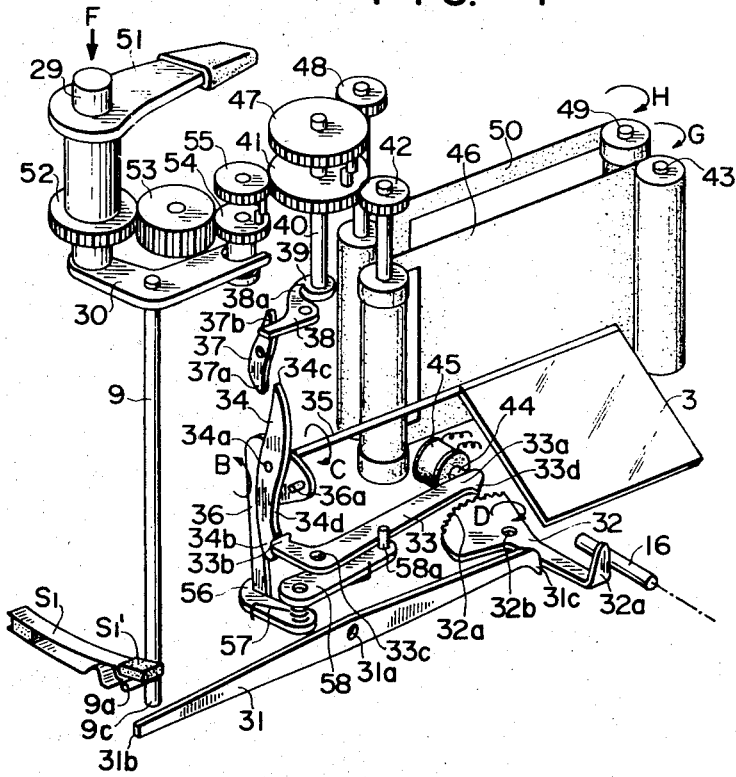
FIG. 4 is a perspective view showing the arrangement of the principal parts of a second embodiment in accordance with the present invention.
Figure 6:
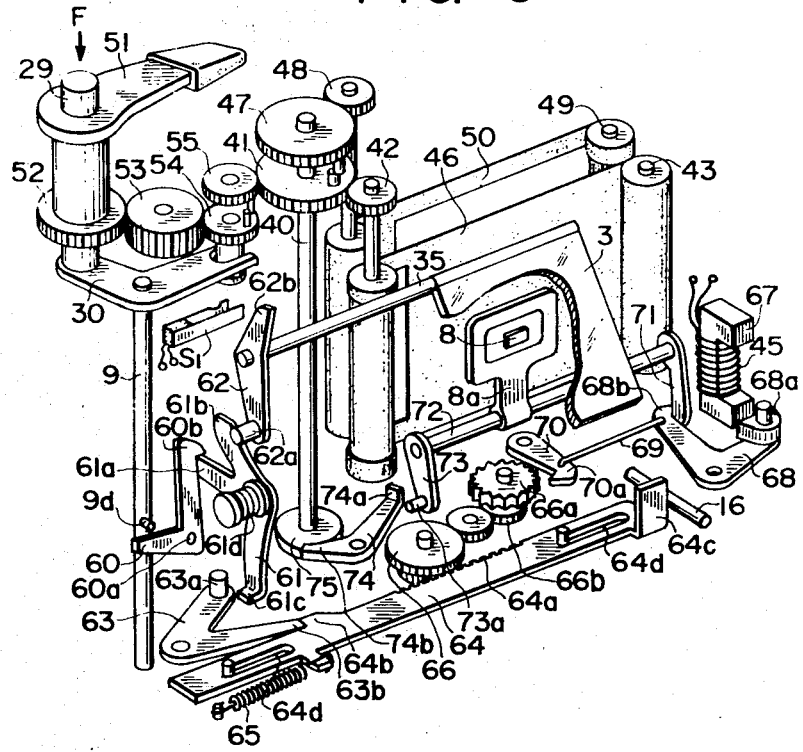
FIG. 6 is a perspective view showing the arrangement of the principal parts of a third embodiment in accordance with the present invention.

This three-armed connecting lever 26 is supported for rotation about an axle mounted on the camera body and extending through an axle hole 26a. Lever 26 is biased for rotation in a clockwise direction and is provided with a pin 26c mounted at the end of its second arm. The third arm 26d of lever 26 is located above a gear 28. This gear 28 meshes with a gear 47 of the rear curtain of the shutter as shown in FIGS. 4 and 6, to be hereinafter described, and is mounted for rotation about an axle extending through an axle hole 28a. Also, gear 28 is provided with a projecting pin 28b. This pin 28b is engageable with third arm 26d during completion of the driving of the rear curtain of the shutter and so as to rotate connecting lever 26 clockwise. Thus, lever 21 is rotated counterclockwise against spring 22 and lever 13 is rotated counterclockwise against spring 14 via pin 21b. Pin 26c of connecting lever 26 therefore releases the engagement between pawl 13e and toothed portion 12a of working plate 12 during counterclockwise rotation of stop lever 13 thereby moving it into contact with electromagnet 15. Also, hook 26b is detached from projection 27b of mirror return lever 27 to thereby release the turning retention of lever 27.

Diaphragm adjusting pin 16 is mounted firmly into a rotatable diaphragm working ring 17 so arranged that the optical axis of objective lens 1 is at the center within the attachable lens. This diaphragm working ring 17 is biased for rotation in a clockwise direction by means of a spring (not shown in the drawing) and a projecting pin 17a is provided on ring 17 for engagement with a projection 18a of a diaphragm ring 18 which is rotatable about a common center with the diaphragm working ring 17.

This diaphragm ring 18 is biased for rotation in a clockwise direction by means of a relatively weak spring (not shown) so that pin 17a will be maintained in engagement with projection 18a for controlling the opening and closing of diaphragm blades 19 (only one of which is shown in the drawing). That is, when diaphragm ring 18 rotates counterclockwise, diaphragm blades 19 are opened, and when the diaphragm ring rotates clockwise, the blades are closed.

Figure 3:
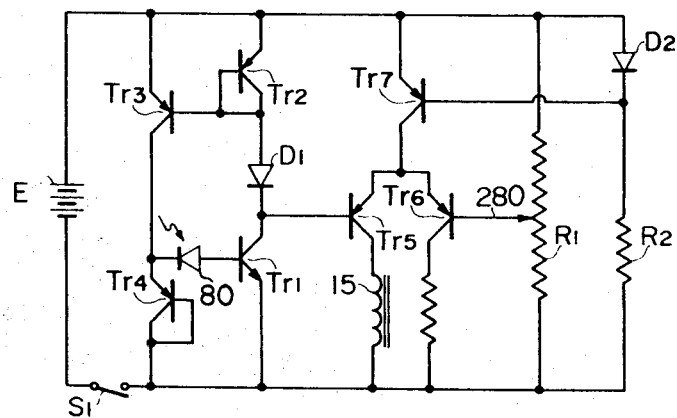
FIG. 3 is a circuit diagram showing an exposure controlling circuit in the first embodiment.

The exposure controlling circuit is illustrated in FIG. 3. In the drawing, E represents a power battery and $S_1$ shows a switch which is closed at an early stage of the stroke of shutter button 9 when it is pressed down.

When switch $H_1$ is closed, the current generated by the scene light passing through objective lens 1 and diaphragm 2 and supplied for photoelectric cell 8 is amplified by a transistor $Tr_1$.

Transistor $Tr_2$, $Tr_3$ and $Tr_4$ are connected to cause a short circuit between the terminals of photovoltaic cell 80, to remove the leakage current of this cell and to make it possible to detect precisely generated current within the limits of low intensity if illumination.

Transistors $Tr_5$ and $Tr_6$ constitute a differential amplifier circuit which may utilize high input transistors or may be amplified by transistors with two or three stages, so that the current flowing through transistor $Tr_1$ may be ignored, by decreasing the base currents of transistors $Tr_5$ and $Tr_6$.

Transistor $Tr_7$, diode $D_2$ and resistance $R_2$ are designed to improve the properties of the differential amplifier circuit. Variable resistance $R_1$ is designed to set up the shutter speed and the film sensitivity in the camera.

With the arrangement of such a circuit as described above, the short-circuit current of photovoltaic cell 80 is amplified by transistor $Tr_1$ and the collector current of transistor $Tr_1$ varies in a manner depending upon an exponential function in proportion to the quantity of light brought incident upon photovoltaic cell 80. However, the voltage compressed logarithmically by diode $D_1$ and transistor $Tr_2$, having the properties of a diode, is impressed between the collector of transistor $Tr_2$ and the base of transistor $Tr_5$. Hence, the quantity of light brought incident upon photovoltaic cell 80 varies according to the brightness of an object and the regulated aperture of the diaphragm of an attachable lens, the voltage varied into a linear form according to the brightness of an object and the regulated aperture of the diaphragm of an attachable lens being impressed on the base of transistor $Tr_5$, which is one of the components of the differential amplifier circuit.

On the base of transistor $Tr_6$, which is another of the components of the differential amplifier circuit, the voltage is impressed by slider 280 in a linear form according to the shutter speed and the film sensitivity that are set up in the camera.

Accordingly, when switch $S_1$ is closed by shutter release button 9 and electromagnet 15 is excited, the aperture is cut down by the diaphragm blade from a state in which the aperture is fully opened, and, thereafter, when the base potential of transistor $Tr_5$ according to the brightness of an object and the aperture of the diaphragm of an attachable lens and the base potential of transistor $Tr_6$ coincide with each other, electromagnet 15 is demagnetized so that the aperture size will not be reduced further by means of the diaphragm blade.

Referring to FIG. 2 showing the structural arrangement of the invention, a condition in which the shutter has been charged is shown therein with working plate 12 having been moved completely to the right and the diaphragm blade having been fully opened.

When shutter release button 9 is pressed down in such a position as described above, switch $S_1$ is closed, the exposure controlling circuit is completed, the excited electromagnet 15 is attracted to the armature of stop lever 13, and pawl 13e of lever 13 is maintained in a position where it is withdrawn from toothed portion 12a of working plate 12.

Also, during downward movement of button 9, pin 9b rotates lever 10 clockwise, working plate 12 is caused to start sliding to the left and the aperture size is reduced gradually as the diaphragm blades begin to close from their fully open position via flap 12c, diaphragm adjusting pin 16, diaphragm working ring 17 and diaphragm ring 18. When lever 10 engages with the U-shaped end of retaining lever 21, the latter rotates clockwise to retain lever 10, and pin 21b is moved away from the third arm 13c of stop lever 13.

When, as a result of the action performed by the exposure controlling circuit as described hereinabove, the diaphragm aperture is adjusted correctly to the brightness of an object and the shutter speed and the film sensitivity set up in the camera. Also, electromagnet 15 is demagnetized, stop lever 13 rotates clockwise by means of spring 14, pawl 13e engages with toothed portion 12a of working plate 12, and the reduction of the aperture size by diaphragm blades is stopped as plate 12 is moved to the left.

Thereafter, when shutter release button 9 is pressed down until its lower end 9c contacts camera release lever 23, such lever 23 is rotated clockwise thereby allowing intermediate lever 24 to turn in the direction shown by arrow A. Hence, arm 25a of mirror lever 25 is disengaged from arm 25c, mirror lever 25 turns in the direction shown by arrow B, and mirror 3 is rotated to a position at which an object is photographed. Upon completion of the above rotation, the shutter is released in a known manner. When the driving of the rear curtain of the focal plane shutter is completed, pin 28b of gear 28 engages with third arm 26d of connecting lever 26 to rotate it clockwise so that its hook portion 26b will be disengaged from projection 27b of mirror return lever 27 for turning the latter in the direction shown by the arrow C. Pin 27a therefore rotates mirror lever 25 clockwise to return it to its original position, and pin 26c of connecting lever 26 rotates retaining lever 21 counterclockwise so that the U-shaped end 21a thereof releases lever 10. Also, pin 21b of retaining lever 21 rotates stop lever 13 counter-clockwise to bring its armature into contact with electromagnet 15, thereby withdrawing pawl 13e from toothed portion 12a of working plate 12.

On the other hand, now that lever 10 has been released by retaining lever 21 it is rotated counter-clockwise by means of spring 11, and the lower end 10a thereof moves engagement plate 12 to the right as in FIG. 2. Flap 12c of plate 12 rotates diaphragm working ring 17 counterclockwise via diaphragm adjusting pin 16 of the attachable lens, and pin 17a engages with projection 18a of diaphragm ring 18 to rotate counterclockwise together for opening diaphragm blade 19 fully. Pin 17a is then returned to its original position.

A diaphragm aperture setting ring 20 is shown for adjusting the aperture manually to take photographs when it is desired to set the diaphragm aperture beforehand by manual operation.

Figure 5:
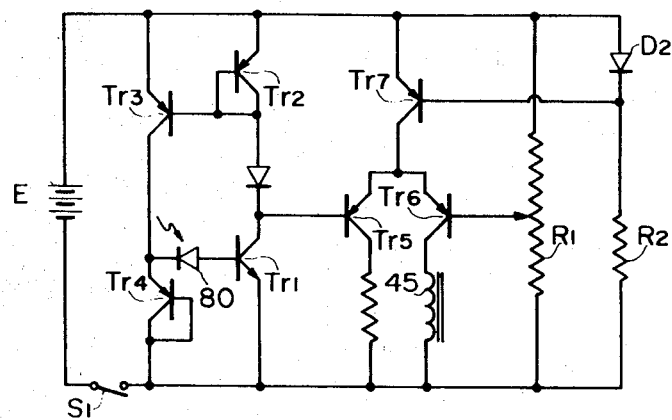
FIG. 5 is a circuit diagram showing the exposure controlling circuit of the second embodiment.

FIG. 4 illustrates a mechanical arrangement of the second embodiment for a camera of the attachable lens type relating to the present invention, and FIG. 5 illustrates the electrical control circuit for this embodiment. In this embodiment the same reference numerals are used for those parts of similar construction and function as the first embodiment.

Release member 9 is shown interconnected with a release button 29 via a coupling plate 30 which is firmly mounted to the upper end of member 9 so that the member 9 and button 29 may function as a unit.

When shutter button 29 is pressed down in the direction shown by the arrow F, coupling plate 30 is also pressed down, thereby moving down release member 9 so that at an early stage of the downward stroke, the first pin 9a moves away from insulating piece $S_1'$ of switch $S_1$ for closing the exposure controlling circuit. When release member 9 is further pressed down, its lower end 9c engages with one end 31b of a lever 31 which is supported for rotation about an axle mounted on the camera body and extending through axle hole 31a. Lever 31 is biased for clockwise rotation by means of a spring (not shown). Hence working lever 32, which bears against the other end 31c of lever 31 and which is biased in the direction shown by the arrow D by means of a spring (not shown in the drawing), starts to rotate clockwise about an axle extending through axle hole 32b when working lever 32 is out of engagement with end 31c. Since a flap 32a of working lever 32 engages with diaphragm adjusting pin 16 of the attachable lens, the diaphragm blade of the same structure as in the first embodiment starts to regulate the aperture thereof. And the diaphragm aperture information fit for the brightness of an object is supplied to light receiving element 8 having good responsivity to the brightness of the light received in the same manner as in the first embodiment.

A stop lever 33 is biased to rotate clockwise about an axle extending through hole 33c by means of a spring (not shown in the drawing), so that the armature formed on one arm 33a having a pawl 33d is attracted to a permanent magnet 44 against the turning tendency of stop lever 33. An electromagnetic coil 45 is wound about permanent magnet 44 as shown in both FIGS. 4 and 5. When the output generated by the shutter speed and the film sensitivity which are set up in the camera, and the output generated in light receiving element 8 by the scene light brought incident upon light receiving element 8 via the objective lens and the diaphragm, are put in a state of balance, permanent magnet 44 and the magnetic force of inverse polarity are formed on electromagnetic coil 45, no attraction is exerted by the permanent magnet 44. Stop lever 33 therefore rotates clockwise, and pawl 33d engages with toothed portion 32a formed on working lever 32 to restrain the rotation of working lever 32. At the same time, the other arm 33b of stop lever 33 is out of engagement with arm 34b of mirror lever 34 so that mirror lever 34 rotates in the direction shown by the arrow B about its axle 34 extending through opening 34a thereby rotating moving mirror 3 in the same direction via axle 35. At the same time, the other arm 34c of mirror lever 34 rotates shutter release lever 37 clockwise, and thereby front curtain retaining lever 38 is actuated to rotate counter-clockwise. Therefore, retaining pawl 38a of front retaining lever 38 releases the retention of cam 39 which is mounted on axle 40. A front curtain gear 41, firmly mounted on axle 40 causes a front curtain 46 to be driven via a gear 42 by means of a front curtain axle 43 biased for rotation in the direction of the arrow G.

On the other hand, a rear curtain gear 47 is fitted freely into axle 40 so that after it has been retained by the time interval of the shutter speed which is set up by means of the shutter mechanism (not shown), it is released for causing a rear curtain 50 to be driven via a gear 48 which is biased for rotation in the direction of arrow H.

A connecting lever 56, as in the first embodiment, is mounted for counterclockwise rotation so that at the instant the exposure is terminated, it releases the retention of mirror return lever 36. Therefore, lever 36 rotates in the direction shown by arrow C by means of a spring (not shown in the drawing), and its pin 36a engages with side edge 34d of mirror lever 34 to rotate mirror lever 34 in the same direction, thereby returning mirror 3 to its original position.

Spring 57 is coupled between connecting lever 56 and a lever 58 which supported for rotation about the same axle as that of lever 56. Lever 58 rotates counter-clockwise in accordance with the counterclockwise rotation of coupling lever 56 for turning stop lever 33 in the same direction as a result of which its pawl 33d is out of engagement with toothed portion 32a and its armature is brought into contact with permanent magnet 44.

While the winding of a film may be done, as is generally known, when winding lever 51 rotates counter-clockwise after photographing is completed front curtain gear 41 rotates clockwise via gears 52, 53, 54 and 55, and the shutter is locked since cam 39 is mounted on gear 41 and engages with retaining pawl 38a of front curtain retaining lever 38.

Referring to the difference between the circuit of the first embodiment illustrated in FIG. 3 and the circuit of FIG. 5, with respect to the connection of electromagnet coil 45, the former is connected with the collector of transistor $Tr_5$, whereas the latter is connected with the collector of transistor $Tr_6$. Hence, in FIG. 3, when the differential amplification circuit is put in a state of balance, electromagnet 15 changes a condition in which electricity is turned on into a condition in which electrically is cut off; whereas, in FIG. 5, electromagnetic coil 45 changes a condition in which electricity is cut off into a condition in which electricity is turned on.

FIG. 6 illustrates the third embodiment of the present invention, that is, an embodiment whereby light receiving element 8 is so arranged that it may rise and fall in front of the film.

When shutter button 29 is pressed down, release member 9 moves down via coupling plate 30 and its pin 9d engages with one arm of a retaining lever 60 to rotate lever 60 counter-clockwise about an axle extending through axle hole 60a. Retaining lever 60 is biased clockwise and its arm 60b moves into and out of engagement with one arm 61a of a three-armed driving lever 61. Since driving lever 61 is biased clockwise by means of a driving spring 61d, its second arm 61b rotates a mirror lever 62 counter-clockwise via pin 62a, thereby effecting a counter-clockwise rotation of moving mirror 3 which is fixedly mounted on axle 35 along with mirror lever 62. Also, during such counter-clockwise rotation, arm end 62b of mirror lever 62 closes switch $S_1$. At the same time, flange 61c of driving lever 61 engages with pin 63a of retaining lever 63 to rotate in counter-clockwise, so that arm end 63b will be moved out of engagement with projection 64b of working plate 64.

Working plate 64, which is guided during its movement right and left by means of guide grooves 64d, and which is urged toward the left by means of a spring 65, has a toothed portion 64a along one edge. A gear 66 of a governor engages with this toothed portion.

Accordingly, when arm end 63b and projection 64b are out of engagement, working plate 64 is driven to the left while being controlled by the governor, and diaphragm adjusting pin 16 of the attachable lens moves toward a flap 64c of plate 64 thereby reducing the aperture by means of the diaphragm blades (not shown in the drawing).

In this way the scene light which passed through the objective lens and the diaphragm blades is brought incident upon light receiving element 8, and information on the brightness of the object and the diaphragm aperture is given to light receiving element 8.

The exposure controlling circuit is the same as that illustrated in FIG. 5, in which, when the differential amplifier circuit is put in a state of balance, electromagnetic coil 45, which is in a condition in which electricity is cut off, is fed with electric current, electromagnet 67 is excited to attract armature 68a of stop lever 68 for turning it counter-clockwise, and hence retaining pawl 70 coupled with said stop lever 68 by coupling member 69 engages with ratched edge 66a of gear 66 interlocking with gear 66 of the governor to retain its rotation and to stop the movement of working plate 64. At the same time, hook portion 68b of stop lever 68 and lever 71 are out of engagement.

A supporting frame 8a of light receiving element 8, is mounted on rotating axle 72 which is biased for movement in a direction by means of a spring (not shown in the drawing). When axle 72 and frame 8a are rotated clockwise at the instant lever 71 and hook portion 68b are out of engagement, light receiving element 8 withdraws from its photographing optical path. At the same time, pin 73a, of levers 73 which is fixedly mounted on revolving axle 72, engages with a projection 74a of shutter release lever 74 to rotate projection 74a counter-clockwise. The other arm 74b therefore releases the retention of cam 75 which is fixedly mounted on axle 40 along with front curtain toothed wheel 41.

Hence, in the same manner as in the second example illustrated in FIG. 4, front curtain 46 is driven via axle 40 and gears 41 and 42 to start exposure. After this, when the time of the shutter speed set up in this camera has passed, rear curtain 50 is also driven, and exposure is terminated.

After exposure is terminated, the various elements may be returned to their positions as shown in FIG. 6 by rotating driving lever 61 counter-clockwise against its spring 61d and bringing its first arm 61a into engagement with hook portion 60a of retaining lever 60.

It will be understood by those skilled in the art that the embodiments of the invention shown and described herein are subject to modification without departing from the scope and spirit of the invention.

Accordingly, it should be understood that the invention is not limited by the embodiments shown and described.

We claim:

1. An automatic exposure control device for a photographic camera having an objective lens and a diaphragm, comprising:
   a light receiving element receiving scene light passing through the objective lens and an aperture of the diaphragm;
   a shutter for giving exposure according to set shutter speeds;
   a release member for initiating exposure operation of said shutter;
   a working member displaceable from its charged position to its position of rest in relation to the operation of said release member;

a diaphragm adjusting member interlocking with said working member for opening the diaphragm aperture fully when said working member is in said charged position and for reducing down said diaphragm aperture with the displacement of said working member to said rest position;

stopper means engageable with said working member for stopping the displacement of the same;

an exposure controlling circuit provided with a detecting circuit including said light receiving element and generatable output as a function of light intensity incident on the light receiving element, the sensitivity of the film used and the set speed of said shutter; and electromagnetic means responsive to the output of said exposure controlling circuit to actuate said stopper means, whereby said diaphragm aperture is stopped at a size according to said scene light.

2. A photographic camera as set forth in claim 1, further comprising a camera body, including said working member and wherein said objective lens is detachable and exhangeable and includes said diaphragm adjusting member which is interlocked with said working member in said camera body when said exchangeable objective lens is attached to said camera body.

3. A photographic camera as set forth in claim 1, wherein said electromagnetic means includes an electromagnet which is energized with the generation of the output in said exposure controlling circuit.

4. A photographic camera as set forth in claim 1, wherein said electromagnetic means includes an electromagnet which is de-energized with the generation of the output in said exposure controlling circuit.

5. A photographic camera as set forth in claim 1, wherein said working member is provided with a toothed portion and said stopper means is provided with a pawl engageable with said toothed portion of said working member.

6. A photographic camera as set forth in claim 5 wherein the camera is a single lens reflex camera having a view finder and comprising:
  a shutter having a front curtain movable from a cocked position to a rest position for initiating exposure;
  a rear curtain movable from a cocked position to a rest position for terminating said exposure;
  a shutter speed setting means for controlling the time interval at which said front curtain and said rear curtain is actuated to be driven;
  a reflecting mirror fixedly mounted on an axle for movement between a viewing position for reflecting the scene light passed through the lens and the diaphragm aperture to the view finder and a picture-taking position;
  said light receiving element receiving said scene light being arranged within an optical path of said scene light reflected by said reflecting mirror at the viewing position;
  a camera body;
  a switch of said controlling circuit being closed with the release operation of said release member;
  a retaining member for retaining said working member at its charged position thereof and for releasing said retention through said release operation of said release member after the closing of said switch is terminated;
  a locking member for retaining said retaining member in its released position and for moving said retaining member into and out of engagement with said stopper means attracted to said electromagnetic means;
  a camera release lever operatively mounted on said camera body for actuation by said release member;
  a mirror lever rotatably mounted on said mirror axle for rotating said mirror from the viewing position to the picture-taking position in relation to the release working of said camera release lever actuated during the last stage of the stroke of said release member during said said release operation;
  a mirror return lever fixedly mounted on said mirror axle and cooperating with said mirror lever for returning said mirror from said picture-taking position to said viewing position;
  a connecting lever operatively mounted on said camera body for engagement with said mirror return lever and said retaining member; and
  means cooperating with said rear curtain for releasing the engagement of said connecting lever with said mirror return lever in relation to the completion of the driving of said return lever from the cocked position to the rest position.

7. A photographic camera as set forth in claim 6 wherein said connecting lever, when in engagement with said mirror return lever, engages with said retaining member which engages with said stopper means, said pawl of said stopper means engaging with said toothed portion of said working member thereby retaining said retaining member; and wherein said connecting member, when moved out of engagement with said mirror return lever in relation with the completion of the rear curtain driving, rotates in the position where said stopper means is brought into contact with said electromagnetic means, thereby breaking the engagement of said locking member with said retaining member.

8. An automatic exposure control device for a photographic camera having an objective lens and a diaphragm, comprising:
  a shutter having a front curtain movable from a cocked position to a rest position for initiating exposure;
  a rear curtain movable from a cocked position to a rest position for terminating said exposure;
  a shutter speed setting member controlling the time interval at which said front curtain and said rear curtain is actuated to be driven;
  a light receiving element receiving a scene light passing through the objective lens and an aperture of the diaphragm;
  a view finder;
  a release member for initiating exposure operation of said shutter;
  a working member displaceable from its charged position to its position of rest in relation to the operation of said release member;
  a reflecting mirror fixedly mounted on an axle for movement between a viewing position for reflecting the scene light passed through the objective lens and the diaphragm aperture to the view finder and a picture-taking position;
  said light receiving element for receiving said scene light being arranged within an optical path of said scene light reflected by said reflecting mirror at the viewing position;

said working member having a toothed portion and means biasing said working member for displacement while releasing the retention of said retaining member;

stopper means provided with a pawl engageable with said toothed portion for stopping the displacement of said work member;

an exposure controlling circuit provided with a detecting circuit including said light receiving element and generatable output as a function of light intensity incident on the light receiving element, the sensitivity of the film used and the set speed of said shutter;

electromagnetic means responsive to the output of said exposure controlling circuit to actuate said stopper means, whereby said diaphragm aperture is stopped at a size according to said scene light;

said exposure controlling circuit including a switch which is closed at a first stage of a stroke of said release member during its release operation;

a retaining member for retaining said working member at its charged position thereof and for releasing said retention through said release operation of said release member at a second stage of its stroke;

a mirror lever mounted for rotation on said mirror axle and cooperating with said stopper means so as to be released thereby when said pawl of said stopper means is brought into engagement with said toothed portion and thereby driving said movable reflecting mirror from said viewing position to said picture-taking position;

a mirror return lever fixedly mounted on said mirror axle and cooperating with said mirror lever for returning said mirror from said picture-taking position to said viewing position; and a shutter release lever mounted for cooperation with said mirror lever for releasing the driving of said front curtain from the cocked position to the rest position with the releasing of said mirror lever.

9. An automatic exposure control device for a photographic camera having an objective lens and diaphragm, comprising:

a camera body;

a curtain shutter having a front curtain movable from a cocked position to a rest position for initiating exposure, a rear curtain movable from a cocked position to a rest position for terminating said exposure;

a light receiving element receiving a scene light passing through the objective lens and an aperture of the diaphragm;

a view finder;

a shutter speed setting member for controlling the time interval at which said front curtain and said rear curtain is actuated to be driven;

a reflecting mirror fixedly mounted on an axle for movement between a viewing position for reflecting the scene light passed through the objective lens and the diaphragm aperture to the view finder and the picture-taking position for passing said scene light toward a film;

said light receiving element being positioned between said reflecting mirror and said shutter curtains and movable between a first position within the optical path of the scene light when said reflecting mirror is in said picture-taking position for receiving said scene light and a second position withdrawn from said optical path;

a release member for initiating exposure operation of said curtain shutter;

a driving member operatively mounted on said camera body and being retained by said release member to be released during the release operation of said release member;

a mirror lever fixedly mounted on said mirror axle and engaging with said driving member;

a working member provided with a toothed portion and being urged by a spring means to be driven from a charged position to a rest position;

a retaining member operatively mounted on said camera body and being engageable with said driving member for retaining said working member at said charged position thereof against said spring means;

governor means operatively mounted on said camera body and being provided with a gear for engaging with said toothed portion;

a diaphragm adjusting member interlocking with said working member for opening the diaphragm aperture fully when said working member is retained at the charged position and for cutting down said diaphragm aperture with the displacement of said working member from its charged position to its rest position;

stopper means provided with a pawl engageable with said governor means for stopping the displacement of said working member;

an exposure controlling circuit provided with a detecting circuit including said light receiving element and generatable output as a function of light intensity incident on the light receiving element, the sensitivity of the film used and the set speed of said shutter;

electromagnetic means responsive to the output of said exposure controlling circuit to actuate said stopper means, whereby said diaphragm aperture is stopped at a size according to said scene light; and means on said light receiving element engaging with said stopper means for driving said light receiving element from the first position to the second position with the actuation of said stopper means.

* * * * *